(12) United States Patent
Freedman et al.

(10) Patent No.: US 7,076,370 B1
(45) Date of Patent: Jul. 11, 2006

(54) METHOD FOR DETERMINING BOREHOLE CORRECTIONS FOR WELL-LOGGING TOOLS

(75) Inventors: Robert Freedman, Houston, TX (US); Tracy E. Broussard, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 74 days.

(21) Appl. No.: 11/014,324

(22) Filed: Dec. 16, 2004

(51) Int. Cl.
*G01V 11/00* (2006.01)

(52) U.S. Cl. .................................. 702/6; 702/7; 703/10
(58) Field of Classification Search .............. 702/6–10; 703/10
See application file for complete search history.

(56) References Cited

OTHER PUBLICATIONS

MJD Powell, "Radial Basis Function Methods for Interpolation to Functions of Many Variables," *DAMTP 2001/NA11*, presented at the 5th Hellenic-European Conference on Computer Mathematics in Athens, Greece Sep. 2001, Dept of Applied Mathematics and Theoretical Physics, Univ. of Cambridge.

L Breiman et al., "Variable Kernel Estimates of Mutlivariate Densities," *Technometrics*, V. 19, No. 2, pp. 135-144 (May 1977).

CA Micchelli, "Interpolation of Scattered Data: Distance Matrices and Conditionally Positive Definite Functions," *Constr. Approx. 2: 11-22* (1986).

MD Buhmann et al, "Radial Basis Functions," *Acta Numerica*, pp. 1-38, Cambridge Univ. Press, (2000).

R Rosthal et al., "Field Test Results of an Experimental Fully-Triaxial Induction Tool," *SPWLA 44th* Ann. Logging Symposium (Jun. 22-25, 2003).

MD Buhmann, "Radial Basis Functions," *Cambridge Monographs on Applied and Computational Mathematics*, Ch. 5, Cambridge Univ. Press (2003).

"Cover's Theorem on the Separabilty of Patterns," *Radial Basis Function Networks*, Ch. 5, pp. 256-317.

J Hertz et al., "Unsupervised Competitive Learning," *Introduction to the Theory of Neural Computation*, Ch. 9, Santa Fe Institute, Addison-Wesley Publishing Co., Redwood City, CA (1991).

*Primary Examiner*—Donald McElheny, Jr.
(74) *Attorney, Agent, or Firm*—Martin M. Novack; Bryan L. White; Victor H. Segura (57) ABSTRACT

A method for producing borehole-compensated values from non-borehole-compensated measurement signals taken with a logging device in a borehole in earth formations, includes the following steps: producing a database that includes a multiplicity of data points, each data point representing a combination of formation parameters and borehole parameters, database input vectors representing multi-dimensional non-borehole-compensated model measurement values respectively associated with the data points, and database output vectors representing multi-dimensional borehole-compensated model measurement values respectively associated with the data points; deriving a multi-dimensional measurement signal vector from measurement signals taken with the logging device in the borehole; and interpolating the measurement signal vector using the database to obtain an interpolated output vector representative of borehole-compensated measurement signals.

27 Claims, 8 Drawing Sheets

METHOD FOR DETERMINING BOREHOLE CORRECTIONS FOR WELL-LOGGING TOOLS

FIELD OF THE INVENTION

This invention relates to techniques for determining properties of formations surrounding an earth borehole and, more particularly, to techniques for borehole compensation whereby the effects of the borehole are reduced or eliminated when determining characteristics of the surrounding formations, such as the electrical conductivity thereof.

BACKGROUND OF THE INVENTION

Induction logging has provided important measurements of formation conductivity for many years. Conventional induction logging tools use coils that have magnetic moments with their axes aligned with the tool axes. Techniques have been developed and employed for relatively accurate compensation for borehole effects in these tools. More recently, some induction logging tools employ antennas with magnetic dipole moments oriented in both the longitudinal (i.e., axial) direction, and transverse directions.

Modern induction logging tools, such as the 3-dimensional induction tool described in Rosthal et al., "Field Tests of an Experimental Fully Tri-axial Induction Tool", SPWLA 44$^{th}$ Annual Logging Symposium, June, 2003, acquire large numbers of signals that must be corrected for the effects of the borehole prior to processing the corrected signals to obtain estimates of the formation conductivity tensor. 3-D induction tools are designed to have azimuthal, radial, and axial sensitivity so that the measured signals are sensitive to the conductivity anisotropy and the radial and axial conductivity distributions of the earth formations penetrated by the borehole. In a Cartesian co-ordinate system fixed in the logging sonde, the axial direction is along the direction of the sonde axis (i.e., borehole). Multiple depths of investigation are achieved by employing several (e.g. nine) receivers spatially separated in the axial direction from the transmitter. Each antenna coil has an associated magnetic dipole moment vector whose magnitude is proportional to the product of the cross-sectional area of the coil and the amplitude of the electrical current in the coil. The direction of the magnetic moment vector is normal to the plane of the coil. The directional sensitivity to the formation conductivity distribution is derived from antennas with magnetic dipole moments oriented in both the longitudinal (i.e., axial direction) and transverse directions. In an example of a 3D induction tool described hereinbelow, the transmitter comprises a tri-axial antenna (e.g., solenoidal coils with dipole moments in the longitudinal and two orthogonal transverse directions). The three shortest spacing receivers each have a single longitudinally oriented antenna whereas the six other receivers are tri-axial. The short spacing receivers acquire signals at a single frequency, whereas the six other receivers acquire signals at two frequencies. In induction logging the transmitter is energized by an alternating current that causes alternating currents to flow in the conductive formation and borehole surrounding the logging sonde. The currents induce voltages in the receiver coils that are in-phase (i.e., resistive) and ninety degrees out-of-phase (i.e., reactive) with respect to the transmitter current. The in-phase component is called the R-signal and the out-of-phase component is called the X-signal. A phase-sensitive detector is used to measure both components. A complex or phasor voltage can represent the R and X-channel signals. Each complex voltage includes two distinct measured signals. The set of measured receiver voltages are sensitive to the radial and axial distributions of formation conductivity, and the borehole signal. The measured signals need to be corrected to remove the effects of the borehole and therefore obtain a set of so-called borehole corrected signals. The borehole corrected signals would then be processed to determine, for example, the formation conductivity distribution and anisotropy.

The degree of difficulty of the borehole correction problem for the described type of 3-D induction tool surpasses that of prior art conventional induction tools. One reason is that the 3-D induction tool with several receivers acquires a much greater number of signals than prior tools. For example, the above 3-D induction tool acquires 234 signals (117 complex voltages) at each measured depth in the borehole, whereas a previous generation tool acquires approximately one-tenth as many signals. Transverse magnetic dipole (TMD) transmitter coils can create axial borehole currents that produce receiver signals with very large borehole effects, which is another reason why correcting the 3-D induction tool signals for borehole effects is more challenging than for conventional induction tools. TMD transmitter coils can excite long-range longitudinal (i.e., axial) currents in the borehole that can couple very strongly into the receiver coils. On the other hand, conventional induction tools have longitudinally oriented transmitter and receiver coils that produce borehole and formation currents that flow in planes transverse to the axial or borehole direction and therefore the receiver signals they excite have by comparison smaller borehole signals.

Aside from the large number of data channels, the limitations of prior art methods for computing borehole corrected signals for a 3-D induction tool stem also from the fact that the borehole signal for each data channel depends in a non-linear and complex fashion on numerous quantities including: borehole radius, mud conductivity, near wellbore formation conductivity, formation conductivity anisotropy factor, and tool position or standoff for an eccentered tool. For previous generation induction tools, the borehole signal did not typically depend on conductivity anisotropy or on the direction of the standoff.

The dependence of the borehole effect on the direction of the standoff for a TMD transmitter can be understood by a simple symmetry argument. A TMD coil excites circular current loops transverse to the direction of the dipole moment. By symmetry arguments, for a centered tool in a circular borehole, there is no net current flow in the direction of the receivers because there are equal and opposite currents flowing in the axial (borehole) direction. The same symmetry argument holds in circular boreholes if the coil is eccentered in a direction parallel to the dipole moment of the coil. In these cases the borehole effect on a received signal from a TMD transmitter is no worse than that from a coil with a longitudinal magnetic dipole (LMD) moment. The symmetry is broken, however, if the coil is displaced in a direction perpendicular to the dipole moment. In the latter case there is a net axial current that can strongly couple into the receiver coils and result in a larger borehole effect than that for a LMD transmitter having receiver coils at the same spacings. Consider the standoff direction for a TMD transmitter whose dipole moment is oriented along the x-direction. The direction of the standoff can be described by the unit vector, $\hat{n} = \hat{x} \cos \phi + \hat{y} \sin \phi$, where $\phi$ is the azimuthal angle measured from the x-direction. A displacement of the dipole along the x-direction from the center of the borehole corresponds to $\phi = 0$ degrees whereas a displacement along the y-direction corresponds to φ=90 degrees. In general, the standoff direction and the magnitude of the standoff will correspond to an arbitrary and usually unknown value of the azimuthal angle.

If all of the aforementioned parameters upon which the borehole signal depends were known during logging operations, then a forward model consisting of a formation penetrated by a borehole could be used to invert the 3-D induction raw measurements and determine the formation electrical properties. This approach is not viable because some of the parameters upon which the borehole effect depends are typically either not known (e.g., conductivity anisotropy, standoff) or only known approximately. Alternatively, an inversion might be used to determine both borehole and formation properties. But the latter approach is not viable either, because the computations would be computationally too intensive to be performed in real time during logging operations.

Various techniques for implementing borehole correction are disclosed in the following prior documents: "Real-Time Environmental Corrections for the DIT-E Phasor Dual Induction Tool" by T. Barber published by the Soc. of Prof. Well Log Analysts, 26$^{th}$ Annual Logging Symposium, Paper EE, 1985; "Accurate Logging in Large Boreholes" by C. Kienitz et al. published by the Soc. of Prof. Well Log Analysts, 27$^{th}$ Annual Logging Symposium, Paper III, 1986; U.S. Pat. No. 5,041,975; and U.S. Pat. No. 6,381,542. The techniques of these documents have one or more of the following limitations: use of charting that is not viable for a 3D induction tool; parameterization based on less complex tool responses; difficult empirical estimation of parameters; and/or use of algorithms that exhibit impractical convergence.

It is among the objects of the present invention to overcome limitations of prior art techniques with regard to borehole correction, particularly in complex tools, and to provide a method that: (1) does not require knowledge of the borehole parameters, (2) does not require or use a forward model to invert the measured signals, and (3) can be used to predict borehole corrected signals in substantially real time.

SUMMARY OF THE INVENTION

A borehole correction method hereof reduces the borehole correction problem to a multivariate interpolation problem in a high-dimensional space. Suppose that one has a database of uncorrected or raw (i.e., includes borehole effects) array responses and associated borehole corrections for each array. The raw array responses can be computed by solving Maxwell's equations for a 3-D induction tool in an infinite transversely anisotropic homogeneous medium penetrated by a borehole. Borehole corrections can be computed for each case by subtracting from each raw array response the computed raw array responses in the absence of a borehole. Note that the computed raw array responses in the absence of a borehole are simply the borehole corrected signals. The database is computed for a large number of cases where each specific case has a distinct set of specified borehole parameters (r, $\sigma_m$), tool standoff ($\vec{d}$), and formation conductivity parameters ($\sigma_h$, $\sigma_v$).

The database then has an input-output pair for each case. For example, the database inputs are the raw array signals and the outputs are the borehole corrected array signals (or alternatively the outputs can be the borehole corrections for each array). The relation between the inputs and outputs can be viewed as a non-linear mapping of the input data into the output data. The method of radial basis function (RBF) interpolation provides a method for constructing the mapping function using the database input-output pairs (see e.g., M. J. D. Powell, "Radial Basis Function Methods for Interpolation to Functions of Many Variables", presented at the Fifth Hellenic-European Conference on Computer Mathematics and its Applications, Athens, September, 2001; Simon Haykin, Neural Networks, A Comprehensive Foundation, Chapter 5, "Radial Basis Function Networks", published by Prentice Hall, Second Edition, 1999). The construction of a radial basis mapping function for multivariate interpolation is achieved by finding the optimal hypersurface that passes through or, in other words, is a best fit to, the set of database input-output pairs. The mapping function can be used to predict, by interpolation on the optimal hypersurface, borehole corrected array signals from inputs that are raw array signals not in the database. Radial basis function interpolation is computationally fast and does not require knowledge of borehole parameters, tool parameters, or formation parameters. It can provide accurate borehole corrected array signals provided that a comprehensive database of cases is computed. RBF interpolation is more robust than conventional interpolation schemes like polynomial splines. It has been shown to work well for interpolating scattered data and for relatively sparse databases (see e.g. Martin D. Buhmann, Radial Basis Functions: Theory and Implementations, Chapter 5, "Radial Basis Functions on Scattered Data", Cambridge University Press, 2003). Unlike artificial neural networks (ANN), radial basis function interpolation does not require lengthy iterative training and is much simpler to implement than an ANN.

In accordance with an embodiment of the invention, a method is provided for producing borehole-compensated values from non-borehole-compensated measurement signals taken with a logging device in a borehole in earth formations, including the following steps: producing a database that includes a multiplicity of data points, each data point representing a combination of formation parameters and borehole parameters, database input vectors representing multi-dimensional non-borehole-compensated model measurement values respectively associated with said data points, and database output vectors representing multi-dimensional borehole-compensated model measurement values respectively associated with said data points; deriving a multi-dimensional measurement signal vector from measurement signals taken with the logging device in the borehole; and interpolating the measurement signal vector using the database to obtain an interpolated output vector representative of borehole-compensated measurement signals.

In a preferred embodiment of the invention, the step of producing a database includes deriving a radial basis function mapping function, and the step of interpolating comprises radial basis function interpolation. In this embodiment, the step of producing the database includes computing the database input vectors from the response of the logging device in a model formation with a borehole, and computing the database output vectors from the response of the logging device in a model formation without a borehole.

In an illustrated embodiment hereof, the tool is a 3D induction tool operating as a wireline logging device in an open hole situation. However it will be understood that the tool may be another type of induction logging tool, or a tool that operates on a different principle (examples being resistivity, nuclear, or acoustic) and which benefit by borehole correction. Also, the tool may be of a type that is used in a cased borehole, or may be of a type that is used on a drill string in a measuring while drilling or tripping system.

Further features and advantages of the invention will become more readily apparent from the following detailed description when taken in conjunction with the accompanying drawings.

DETAILED DESCRIPTION

Figure 1:
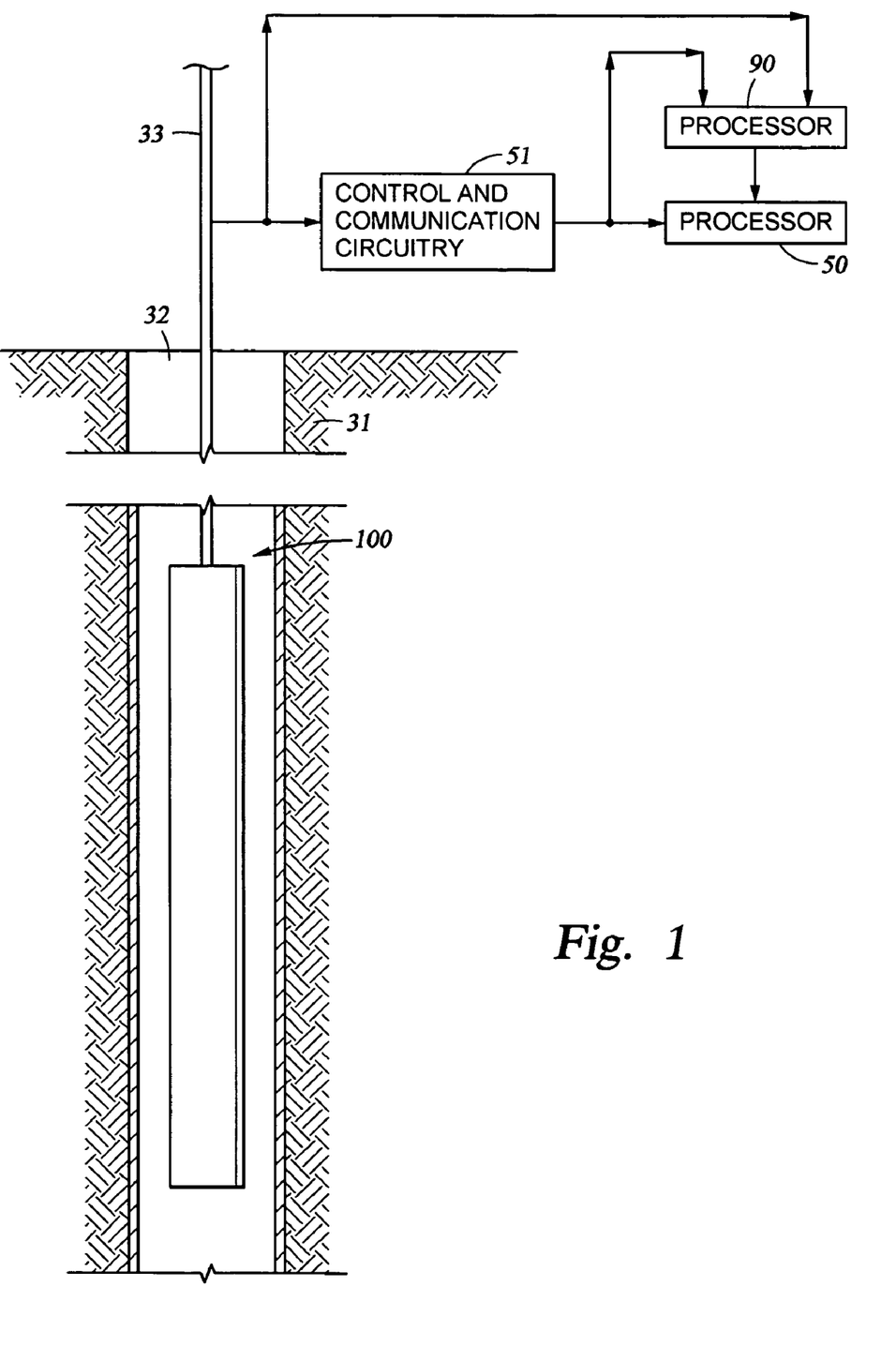
FIG. 1 is a diagram, partially in block form, of logging apparatus of a type that can be used in practicing embodiments of the invention.

FIG. 1 shows the borehole 32 that has been drilled in formations 31, in known manner, with drilling equipment, and typically using drilling fluid or mud that results in a mudcake represented at 35. A logging device 100 is shown, and can be used in practicing embodiments of the invention. The device or tool 100, which in an example hereof is an induction logging tool, is suspended in the borehole 32 on an armored multiconductor cable 33, the length of which substantially determines the depth of the device 100. Known depth gauge apparatus (not shown) is provided to measure cable displacement over a sheave wheel (not shown) and thus the depth of logging device 100 in the borehole 32. Circuitry 51, shown at the surface although portions thereof may typically be downhole, represents control and communication circuitry for the investigating apparatus. Also shown at the surface are processor 50 and recorder 90.

Figure 2:
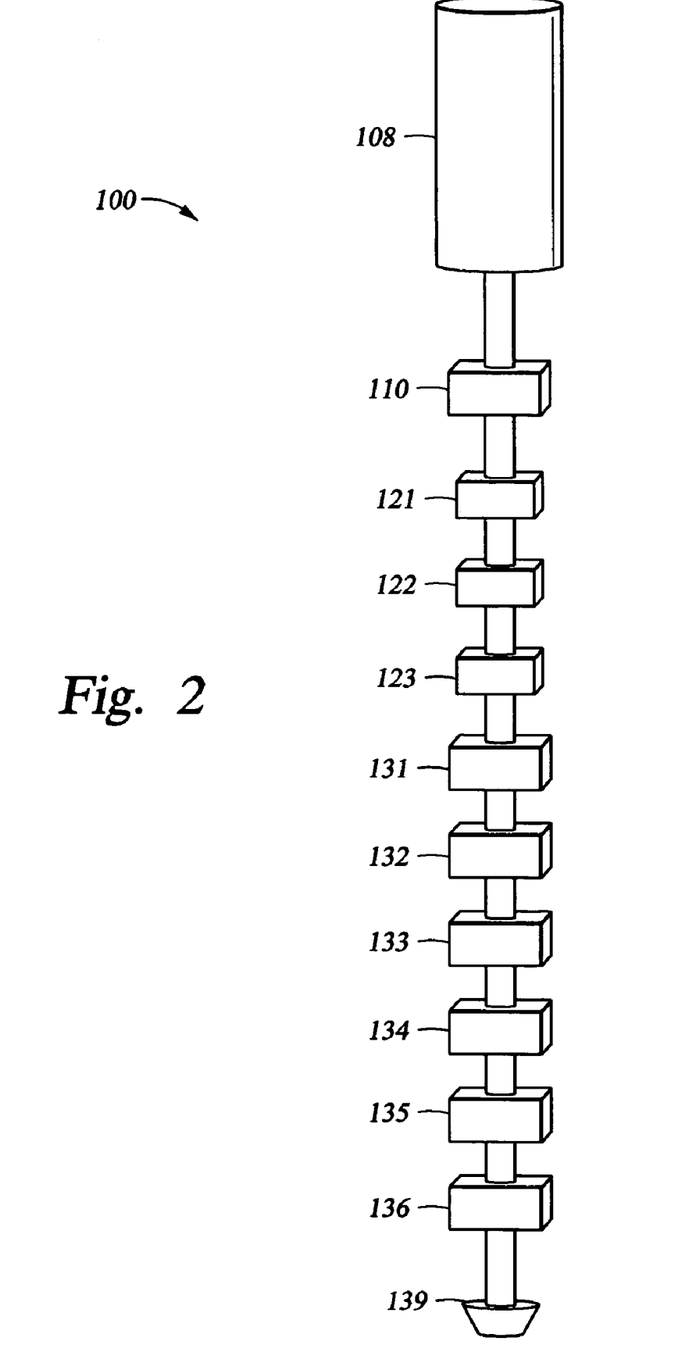
FIG. 2 shows a simplified diagram, partially in block form, of a logging tool that can be used in practicing embodiments of the invention.

FIG. 2 shows an example of a three-dimensional induction logging tool 100, of a type that can be used in practicing an embodiment of the invention. The logging tool can be of the general type described in Rosthal et al., "Field Test Results Of An Experimental Fully-Triaxial Induction Tool." SPWLA 44$^{th}$ Annual Logging Symposium, June, 2003. In the tool of FIG. 2, 108 represents an electronics housing and 110 represents a triaxial transmitter antenna. The triaxial antennas (transmitting or receiving) include a conventional longitudinal antenna (with its axis in the z-direction) and two orthogonal transverse antennas. In the FIG. 2 example, the three most closely spaced receiving antennas, 121, 122, and 123, are conventional type longitudinal antennas, and the six successively longer spaced receiving antennas 131, 132, 133, 134, 135, and 136, are triaxial receiving antennas. In the FIG. 2 tool, the transmitter operates at two frequencies. The three shorter spacing receiving antennas (121–123) acquire signals at a single frequency, and the six longer spacing receiving antennas (131–136) acquire signals at both frequencies. In induction logging the transmitter is energized by an alternating current that causes alternating currents to flow in the conductive formation and borehole surrounding the logging sonde. The currents induce voltages in the receiver coils that are in-phase (i.e., resistive) and ninety degrees out-of-phase (i.e., reactive) with respect to the transmitter current. The in-phase component is called the R-signal and the out-of-phase component is called the X-signal. A phase-sensitive detector is used to measure both components. A complex or phasor voltage can represent the R and X-channel signals. The number of distinct measured signals is twice the number of complex signals. Accordingly, in the present example there are 117 complex measurement signals (3×3×1+6×3×3×2) and 234 distinct measured signals. The set of measured receiver voltages are sensitive to the radial and axial distributions of formation conductivity, and the borehole signal.

Some theory used in the invention will next be described. The problem of predicting borehole corrected signals from a database of training cases or input-output pairs can be cast as a non-linear multivariate interpolation problem. Given a set of input data $\vec{x}_i \in R^n$ (i.e., the inputs are n-dimensional real vectors) and a set of corresponding real outputs $\vec{y}_i \in R^m$ for, i=1,2, . . . ,N, where N is the number of different database cases, find a mapping function, $\vec{F}(\vec{x})$, which satisfies the interpolation equations, $$\vec{F}(\vec{x}_i) = \vec{y}_i, \qquad (1)$$

for i=1,2 . . . , N. Note that the input ($\vec{x}_i$) and output vectors ($\vec{y}_i$) belong to different spaces, and therefore, in practical applications they often have very different dimensions. Using the theory of radial basis function interpolation, the mapping function can be written in the form:

$$\vec{F}(\vec{x}) = \sum_{i=1}^{N} \vec{w}_i \varphi(\|\vec{x} - \vec{x}_i\|) \qquad (2)$$

where $\{\varphi(\|\vec{x} - \vec{x}_i\|), i=1,2, \ldots, N\}$ are a set of non-linear functions known as radial basis functions. The double bars denote the Euclidean norm or distance separating an arbitrary input vector, $\vec{x}$, from the database input vectors, $\vec{x}_i$. The weight vectors in Eq. 2 can be determined by requiring that the interpolation conditions in Eq. 1 are satisfied. The interpolation conditions lead to linear equations with a solution of the form, $$\vec{w}_i = \sum_{k=1}^{N} \Phi_{i,k}^{-1} \vec{y}_k \qquad (3)$$

where $\Phi_{i,j} = \varphi(\|\vec{x}_i - \vec{x}_j\|)$ is the N×N interpolation matrix. Note that no iterations are required to determine optimal weights. C. A. Micchelli ("Interpolation of Scattered Data: Distance Matrices and Conditionally Positive Definite Functions", Constructive Approximation, v. 2, pp 11–22, 1986) has proven that the interpolation matrix is positive definite, for certain classes of functions that include multivariate Gaussian functions, and therefore a unique solution for the weight vectors in Eq. 3 always exist. A non-singular interpolation matrix is one of the advantages of radial basis function interpolation compared to interpolation with polynomial spline functions for which there are no guarantees that the interpolation equations even have a unique solution (e.g., the interpolation matrix can be singular).

In the following, normalized multivariate Gaussian radial basis functions centered at the database input vectors are used to illustrate a method used in an embodiment hereof and Eq. (2) is rewritten in the form, $$\vec{F}(\vec{x}) = \frac{\sum_{j=1}^{N} \vec{w}_j \exp\left(-\frac{\|\vec{x} - \vec{x}_j\|^2}{2s_j^2}\right)}{\sum_{j=1}^{N} \exp\left(-\frac{\|\vec{x} - \vec{x}_j\|^2}{2s_j^2}\right)}. \quad (4)$$

In Eq. 4 the widths ($s_j$) of the radial basis functions are parameters that can be determined by non-linear minimization of a cost function together with the weight vectors ($\vec{w}_j$) by requiring that the mapping function in Eq. 4 satisfies the regression equations in Eq. (1). In practical applications good results are often obtained by using a single width parameter (s) for all of the basis functions. Likewise it is sometimes useful to select a subset of the database input vectors for the centers of the radial basis functions. In this case the interpolation matrix is not square but can nevertheless be inverted, for example, using a pseudo inverse. For very large databases one can choose a subset of the database input vectors by using a clustering algorithm to consolidate groups of nearby inputs. Optimal widths for the radial basis functions can be determined using Euclidean distances to the nearest or first few nearest neighbors of the input vectors.

The mapping function in Eq. (4) is used to predict an unknown output vector ($\vec{y}$) corresponding to an input vector ($\vec{x}$) that is not in the database. The following treats an approximation for the weight vectors and provides some intuitive insight into how the radial basis mapping function interpolates in the database to predict the output vectors.

An intuitive understanding of how the mapping function in Eq. 4 predicts an output vector for an input vector not in the database can be gleaned by considering the Nadaraya-Watson Regression Estimator (NWRE). The NWRE is based on a simple approximation for the weight vectors. The NWRE approximation assumes a common width for the Gaussian functions and therefore for input, $\vec{x}_i$, Eq. 4 can be re-written in the form, $$\vec{F}(\vec{x}_i) = \frac{\vec{w}_i + \sum_{\substack{j=1 \\ j \neq i}}^{N} \vec{w}_j \exp\left(-\frac{\|\vec{x}_i - \vec{x}_j\|^2}{2s^2}\right)}{1 + \sum_{\substack{j=1 \\ j \neq i}}^{N} \exp\left(-\frac{\|\vec{x}_i - \vec{x}_j\|^2}{2s^2}\right)}. \quad (5)$$

The summations in Eq. 5 can be dropped if the overlaps of the Gaussian functions are negligible. In this approximation one finds, $\vec{F}(\vec{x}_i) \cong \vec{w}_i$ which means that an approximate solution to the regression or interpolation equations in Eq. 1 is obtained by replacing the weight vectors by the database output vectors. Using this approximation in Eq. 5 one obtains the NWRE mapping function, $$\vec{F}(\vec{x}) = \frac{\sum_{j=1}^{N} \vec{y}_j \exp\left(-\frac{\|\vec{x} - \vec{x}_j\|^2}{2s^2}\right)}{\sum_{j=1}^{N} \exp\left(-\frac{\|\vec{x} - \vec{x}_j\|^2}{2s^2}\right)}. \quad (6)$$

In the limit of very large widths (s), $\vec{F}(\vec{x})$ approaches the sample mean of the database output vectors. In the limit of very small widths, $\vec{F}(\vec{x})$ approaches the output vector $\vec{y}_j$ corresponding to the database input vector $\vec{x}_j$ that is closest to $\vec{x}$. In general, $\vec{F}(\vec{x})$ is a weighted average of the database output vectors with weighting factors determined by the closeness of $\vec{x}$ to the database input vectors. The optimal width (s) of the Gaussian functions can be determined by selecting the value such that Eq. 6 provides a best fit to the interpolation conditions in Eq. 1. This can be done by trial and error since the optimal width is found, in many practical applications, to lie in a relatively broad plateau. The mean of the nearest or first few nearest neighbor (J. Hertz et al., "Introduction to the Theory of Neural Computation", published by Santa Fe Institute, 1993, pp. 248–249) or more distant neighbor distances (e.g., see the paper by L. Breiman et al. "Variable Kernel Estimates of Multivariate Densities", *Technometrics*, v. 19, no. 2, 135–144) have been found to provide good results in other applications.

Optimal weights and widths can be estimated by minimization of a non-linear cost function. For example, minimization of the cost function (C)

$$C = \sum_{i=1}^{N} \sum_{l=1}^{m} \left[ y_{i,l} - \frac{\sum_{j=1}^{N} w_{j,l} \exp\left(-\frac{\|\vec{x}_i - \vec{x}_j\|^2}{2s^2}\right)}{\sum_{j=1}^{N} \exp\left(-\frac{\|\vec{x}_i - \vec{x}_j\|^2}{2s^2}\right)} \right]^2 \quad (7)$$

with respect to the weight vectors and the width parameter determines optimal values for these parameters. The first subscript on $y_{i,l}$ and $w_{j,l}$ in Eq. 7 denotes a particular database case whereas the second subscript refers to a particular component of the database output vectors and weight vectors, respectively. A more general cost function allows for different width parameters for each radial basis function, however, this added complexity is not required for many practical problems. A regularization term can also be added to the cost function for ill-posed or under-determined optimization problems.

In accordance with an aspect of the invention, radial basis function interpolation is utilized in implementing borehole correction. The induction tool of FIG. 2 measures 117 raw complex voltages that are induced in the receiver coils. After applying downhole electronic calibrations and gain corrections, the measured voltages are converted to fully calibrated raw apparent conductivities. It is the measured raw apparent conductivities that must be borehole corrected before further data processing is performed to estimate formation conductivity distributions.

A database of raw (i.e., not corrected for borehole effects) apparent conductivities, $\vec{\sigma}_{a,i}^{(raw)}$ for i=1,2 ... N can be computed by solving Maxwell's equations for the induction tool of FIG. 2 in boreholes with radii ($r_i$), standoffs ($\vec{d}_i$), and mud conductivities ($\sigma_{m,i}$) which penetrate formations with vertical ($\sigma_{v,i}$) and horizontal ($\sigma_{h,i}$) conductivities. The modeled database cases are for infinitely homogeneous and "transversely anisotropic" media for which the horizontal conductivities in the planes perpendicular to the borehole are different from the vertical conductivities in the planes parallel to the borehole. The anisotropy parameter for a transversely anisotropic formation is defined by $$\lambda = \sqrt{\frac{\sigma_h}{\sigma_v}}. \tag{8}$$

The components of the raw apparent conductivity vectors, $\vec{\sigma}_{a,i}^{(raw)}$, are the R- and X-channel apparent conductivities determined from a subset of the 234 transmitter-receiver couplings measured by the tool. The N cases correspond to choosing different values for the three borehole parameters and two formation parameters in the model. These parameters are each selected to span a set of physically feasible values.

Borehole corrected apparent conductivities, $\vec{\sigma}_{a,i}^{(c)}$, for i=1,2 ... N, are computed by solving Maxwell's equations for the 3-D induction tool in an infinite transversely anisotropic homogeneous medium (i.e., without a borehole). From the raw and borehole corrected apparent conductivities one can compute a borehole correction, $\Delta\vec{\sigma}_{a,i}$, i.e., $$\Delta\vec{\sigma}_{a,i} = \vec{\sigma}_{a,i}^{(raw)} - \vec{\sigma}_{a,i}^{(c)} \tag{9}$$

In the language of radial basis functions, the database described above includes N input vectors, $\vec{\sigma}_{a,i}^{(raw)}$, and the associated output vectors, $\vec{\sigma}_{a,i}^{(c)}$. Note that the borehole corrections in Eq. (9) could be used as the output vectors instead of using the borehole corrected apparent conductivities as the output vectors.

Using the NWRE approximation, the radial basis mapping function for predicting borehole corrected apparent conductivities from measured input data can be written as $$\vec{\sigma}_a^{(c)} = \frac{\sum_{i=1}^{N} \vec{\sigma}_{a,i}^{(c)} \exp\left(-\frac{\|\vec{\sigma}_a^{(raw)} - \vec{\sigma}_{a,i}^{(raw)}\|^2}{2s^2}\right)}{\sum_{i=1}^{N} \exp\left(-\frac{\|\vec{\sigma}_a^{(raw)} - \vec{\sigma}_{a,i}^{(raw)}\|^2}{2s^2}\right)} \tag{10}$$

The input vector, $\vec{\sigma}_a^{(raw)}$, in Eq. 10 contains measured apparent conductivities from the 3-D induction tool. The measured input vector, and therefore also the database input vectors ($\vec{\sigma}_{a,i}^{(raw)}$) may generally contain only a subset of the 234 measured apparent conductivities. The subset of measurements should include both transverse—transverse, transverse-longitudinal, and longitudinal—longitudinal transmitter-receiver couplings and be weighted with more short spaced arrays because they have the most sensitivity to borehole effects. The idea is to include enough information in the radial basis function input vectors to accurately predict the borehole corrected apparent conductivities for all 234 elements in the radial basis function output vector $\vec{\sigma}_a^{(c)}$. It should be clear that one could also use the borehole corrections for each coupling as the database output vectors ($\Delta\vec{\sigma}_{a,i}$) and radial basis function predicted output vectors ($\Delta\vec{\sigma}_a$) in Eq. 10 and then use Eq. 9 to compute $\vec{\sigma}_a^{(c)}$. In that case the NWRE mapping function can be written as, $$\Delta\vec{\sigma} = \frac{\sum_{i=1}^{N} \Delta\vec{\sigma}_{a,i} \exp\left(-\frac{\|\vec{\sigma}_a^{(raw)} - \vec{\sigma}_{a,i}^{(raw)}\|^2}{2s^2}\right)}{\sum_{i=1}^{N} \exp\left(-\frac{\|\vec{\sigma}_a^{(raw)} - \vec{\sigma}_{a,i}^{(raw)}\|^2}{2s^2}\right)} \tag{11}$$

It will be evident that by also including the borehole and formation parameters (e.g., borehole radius, mud conductivity, tool standoff, horizontal conductivity, and resistivity anisotropy) as elements in the database output vectors, that the borehole and formation parameters can also be predicted together with the borehole corrected array data.

The NWRE approximation can be improved upon by determining optimal weight vectors such that the interpolation equations are satisfied. The problem is linear if the widths of the Gaussian radial basis functions are fixed. The interpolation conditions for the borehole correction problem lead to a set of linear equations for the weight vectors whose solution can be written in matrix form, i.e., $$W = G^{-1} \cdot \Sigma \tag{12}$$

where the N×m matrix, W, is given by, $$W = \begin{bmatrix} w_{1,1} & w_{1,2} & \cdots & w_{1,m} \\ w_{2,1} & w_{2,2} & \cdots & w_{2,m} \\ \vdots & \vdots & \vdots & \vdots \\ w_{N,1} & w_{N,2} & \cdots & w_{N,m} \end{bmatrix} \tag{13}$$

where the i-th row of W is the transpose of the weight vector for the i-th database case. That is, the first subscript on each weight runs from 1 to N and denotes a particular database case and the second subscript denotes a particular measurement channel (i.e., transmitter-receiver coupling) and runs from 1 to m where m=234 for the tool of FIG. 2. The matrix G whose inverse appears in Eq. 12 is the N×N positive definite matrix of Gaussian radial basis functions, i.e., $$G = \begin{bmatrix} g_{1,1} & g_{1,2} & \cdots & g_{1,N} \\ g_{2,1} & g_{2,2} & \cdots & g_{2,N} \\ \vdots & \vdots & \vdots & \vdots \\ g_{N,1} & g_{N,2} & \cdots & g_{N,N} \end{bmatrix} \tag{14}$$

where the matrix elements are the normalized Gaussian radial basis functions, $$g_{i,j} = \frac{\exp\left(-\frac{\|\vec{\sigma}_{a,i}^{(raw)} - \vec{\sigma}_{a,j}^{(raw)}\|^2}{2s_j^2}\right)}{\sum_{j=1}^{N} \exp\left(-\frac{\|\vec{\sigma}_{a,i}^{(raw)} - \vec{\sigma}_{a,j}^{(raw)}\|^2}{2s_j^2}\right)}. \quad (15)$$

The N×m matrix, $\Sigma$, in Eq. 12 contains the database outputs, e.g., $$\Sigma = \begin{bmatrix} \sigma_{1,1}^{(c)} & \sigma_{1,2}^{(c)} & \ldots & \sigma_{1,m}^{(c)} \\ \sigma_{2,1}^{(c)} & \sigma_{2,2}^{(c)} & \ldots & \sigma_{2,m}^{(c)} \\ \vdots & \vdots & \vdots & \vdots \\ \sigma_{N,1}^{(c)} & \sigma_{N,2}^{(c)} & \ldots & \sigma_{N,m}^{(c)} \end{bmatrix}. \quad (16)$$

Note that the i-th row is the transpose of the database vector $\vec{\sigma}_{a,i}^{(c)}$. If the outputs of the mapping function were the borehole corrections then in the matrix $\Sigma$ one would replace the elements of $\vec{\sigma}_{a,i}^{(c)}$ with the elements of $\Delta\vec{\sigma}_{a,i}$. The solution of Eq. 12 improves on the NWRE approximation by determining optimal weight vectors with the caveat of having fixed widths for the Gaussian radial basis functions. Next, it is shown how both optimal weights and optimal widths can be determined.

The determination of the optimal weight vectors and widths that satisfy the interpolation conditions in Eq. 1 is a non-linear problem that can be addressed by minimization of an appropriately chosen cost function. The squared error between the apparent borehole corrected conductivities in the database and those predicted by the mapping function are minimized. Thus we are led to minimize the cost function in Eq. 17 with respect to both the weights and widths. The cost function can be written in the form, $$C = \frac{1}{2}\sum_{q=1}^{N}\sum_{r=1}^{m} (\sigma_{q,r}^{(c)} - \bar{\sigma}_{q,r}^{(c)})^2 \quad (17)$$

where the scalars $\sigma_{q,r}^{(c)}$ are the components of the database borehole corrected output vectors and the scalars $\bar{\sigma}_{q,r}^{(c)}$ are the components predicted by the mapping function, i.e., $$\bar{\sigma}_{q,r}^{(c)} = \frac{\sum_{i=1}^{N} w_{i,r}\exp\left(-\frac{\|\vec{\sigma}_{a,q}^{(raw)} - \vec{\sigma}_{a,i}^{(raw)}\|^2}{2s_i^2}\right)}{\sum_{i=1}^{N} \exp\left(-\frac{\|\vec{\sigma}_{a,q}^{(raw)} - \vec{\sigma}_{a,i}^{(raw)}\|^2}{2s_i^2}\right)}. \quad (18)$$

Although the cost function in Eq. 17 provides for equal weighting of the m-apparent conductivities (m is 234 for the tool of FIG. 2) measured by the tool, one can introduce weighting factors, for example, to weight the R-channel data more than the X-channel data. Similarly, one can add a regularization (penalty) term to the cost function to mitigate numerical instabilities that sometimes occur in these types of minimization problems. The objective of minimizing the cost function is to determine optimal weight vectors ($w_{i,j}$) and widths ($s_j$). The minimization can be carried out, for example, by using known optimization packages (e.g., using the Optimization Toolbox of the The Mathworks, Inc.). Optimization algorithms generally work best if analytical gradients of the cost function are available. For the cost function in Eq. 17 analytical expressions are easily derived, e.g., $$\frac{\partial C}{\partial w_{i,j}} = -\sum_{q=1}^{N} (\sigma_{q,j}^{(c)} - \bar{\sigma}_{q,j}^{(c)})g_{q,i} \quad (19)$$

where the $g_{q,i}$ are the normalized Gaussian functions defined in Eq. 15 and, $$\frac{\partial C}{\partial s_i} = -\frac{1}{s_i^3}\sum_{q=1}^{N}\cdot\sum_{r=1}^{m}(\sigma_{q,r}^{(c)} - \bar{\sigma}_{q,r}^{(c)})(w_{i,r} - \bar{\sigma}_{q,r}^{(c)})g_{q,i}\|\vec{\sigma}_{a,q}^{(raw)} - \vec{\sigma}_{a,i}^{(raw)}\|^2. \quad (20)$$

At a minimum of the cost function the above derivatives must vanish. A gradient descent method provides a simple iterative method for determining optimal weights and widths using the above derivatives, i.e., $$w_{i,j}(n+1) = w_{i,j}(n) - \alpha\frac{\partial C}{\partial w_{i,j}}. \quad (21)$$

A similar equation can be written for the width parameters. In Eq. 21, n is an iteration index such that, n=0,1,2, . . . , and $\alpha$ is a learning-rate parameter.

Figure 3:
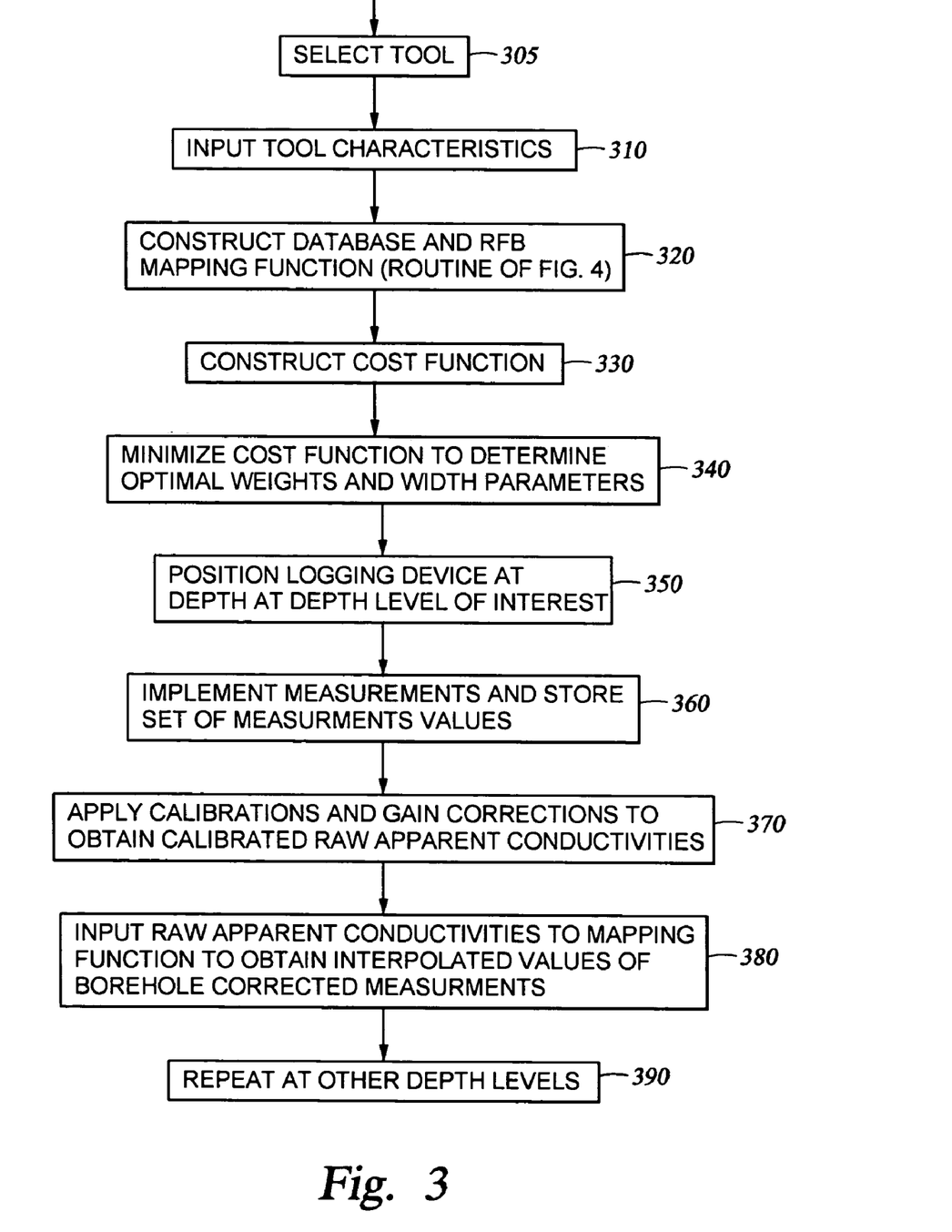
FIG. 3 is a flow diagram of the steps of a routine for practicing an embodiment of the invention.

Referring to FIG. 3, there is shown a flow diagram of a routine for controlling a processor or processors, uphole and/or downhole, in accordance with an embodiment of the invention. Some of the steps may be performed, remote from the wellsite.

The block 305 represents selection of the logging tool to be used. In an example of the present embodiment, the tool is an induction logging device of the type shown in FIG. 2. However, the tool may be another type of induction logging tool, or a tool that operates on a different principle (examples being resistivity, nuclear, or acoustic) and which benefit by borehole correction. The tool characteristics, including its geometry and the equations defining its operating characteristics, are input, as represented by the block 310. The database and RFB mapping functions are then constructed, as represented by the block 320, the routine thereof being described in further detail in conjunction with the following diagram of FIG. 4.

Figure 4:
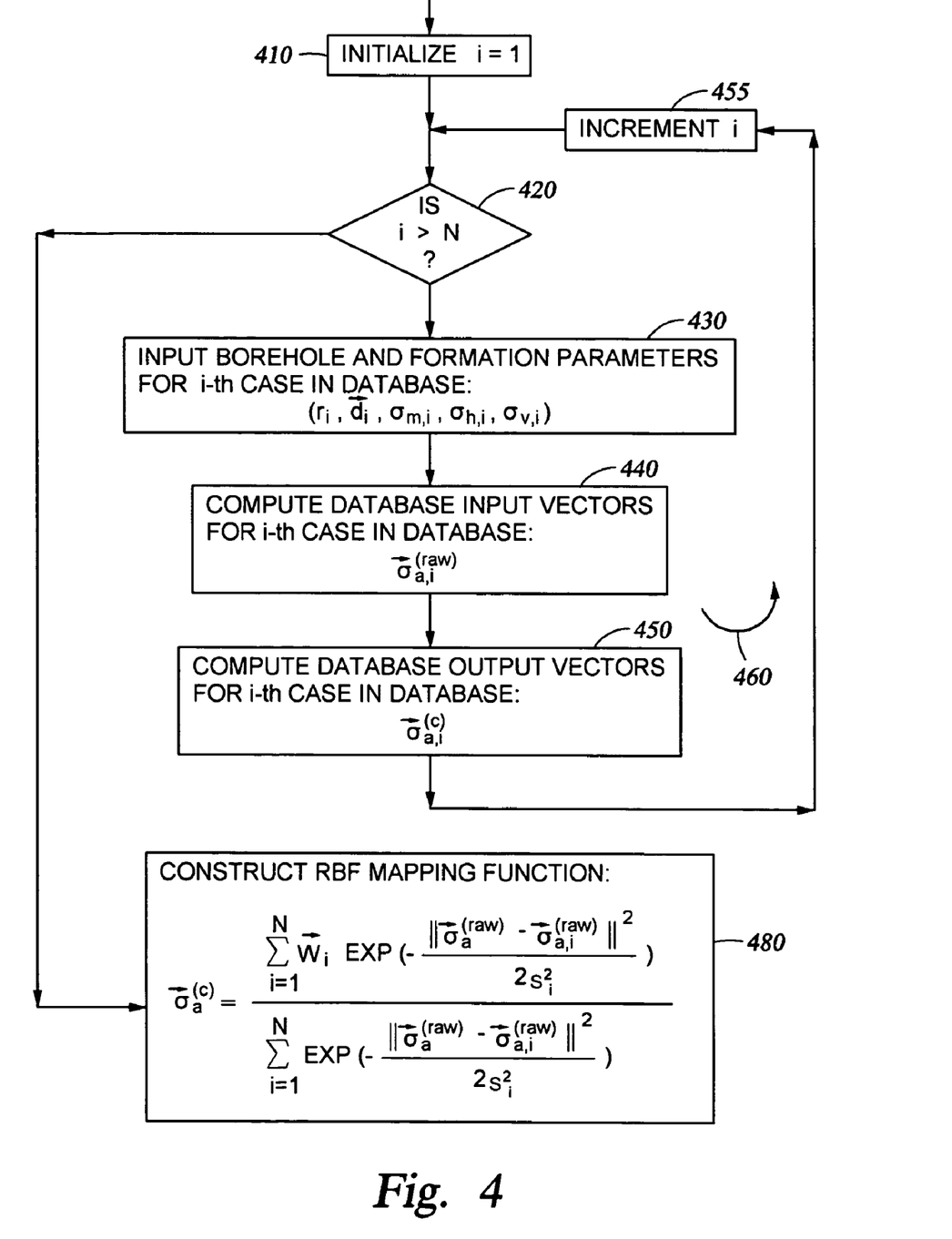
FIG. 4 is a flow diagram of a routine for block 320 of FIG. 3, relating to constructing a database and a mapping function, as used in an embodiment of the invention.
Figure 5:
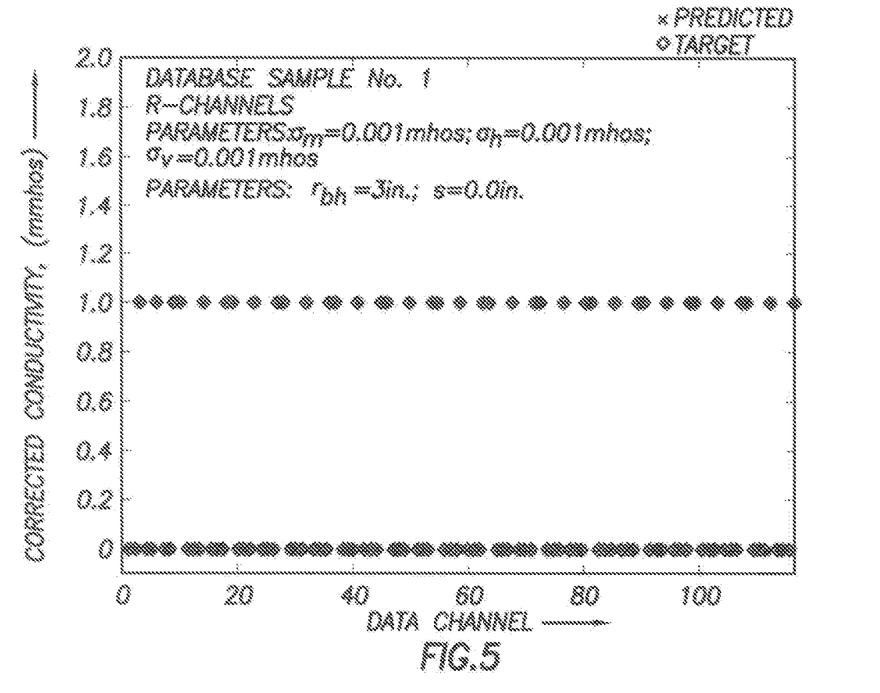
FIGS. 5–11 show graphs of predicted and target responses for illustrative examples. The parameters for each case are shown in the respective Figures.
Figure 6:
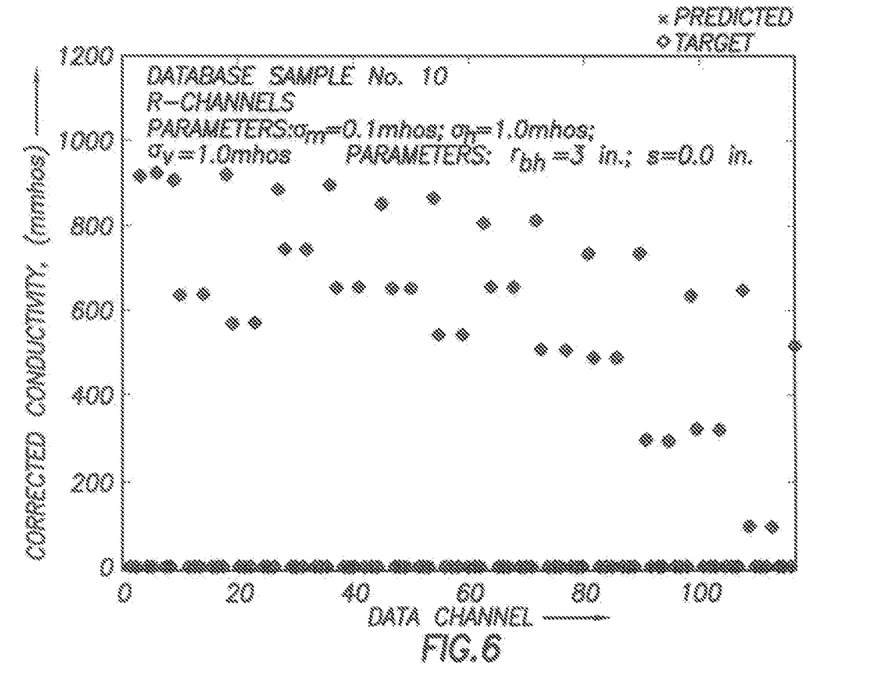
Figure 7:
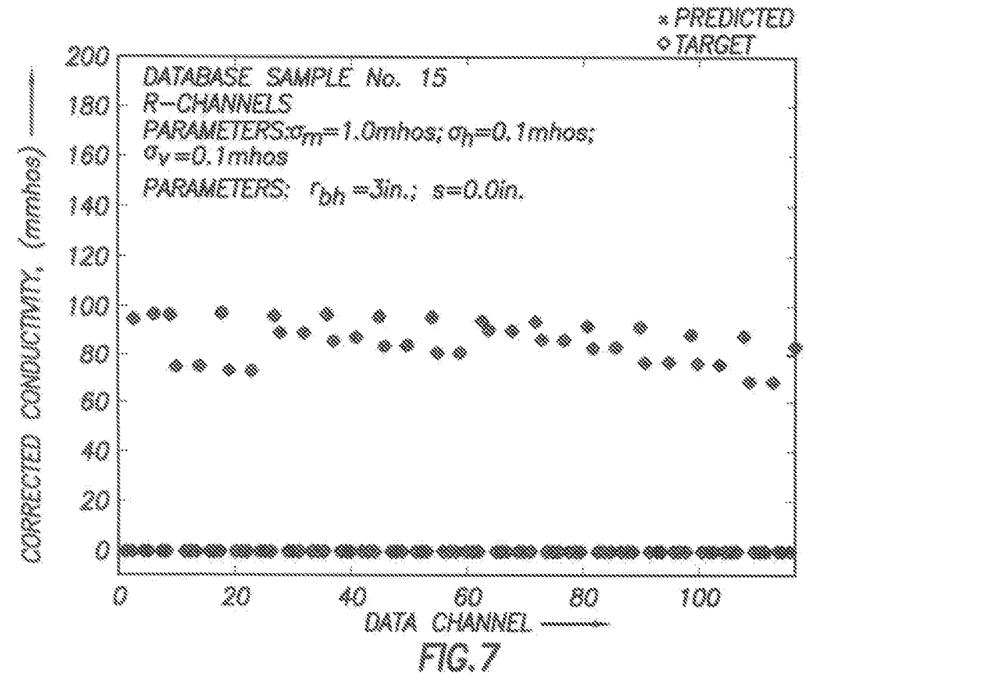
Figure 8:
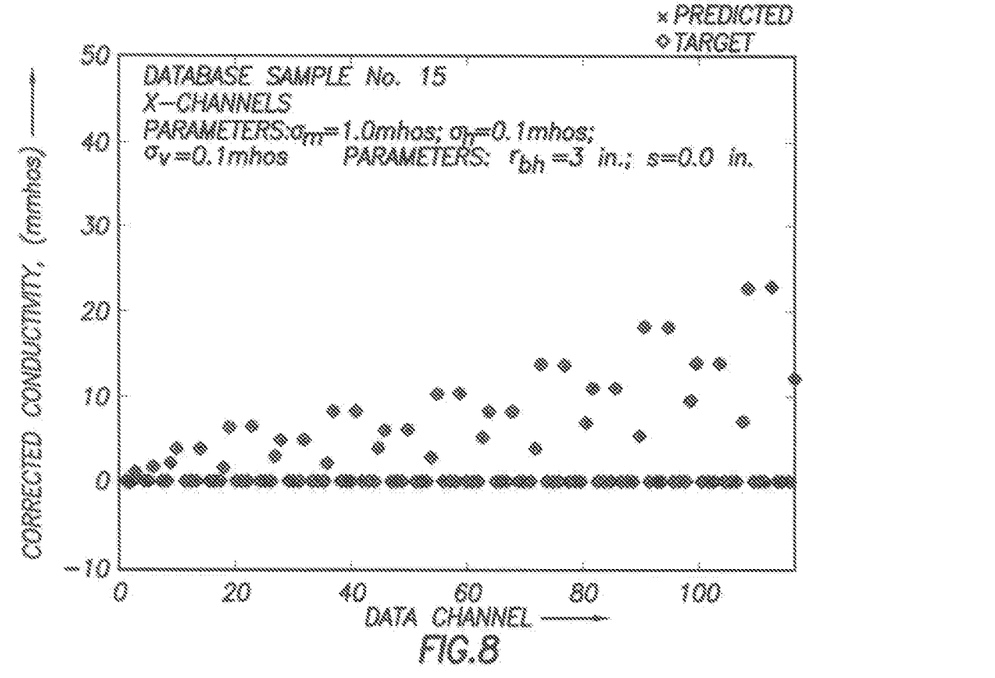
Figure 9:
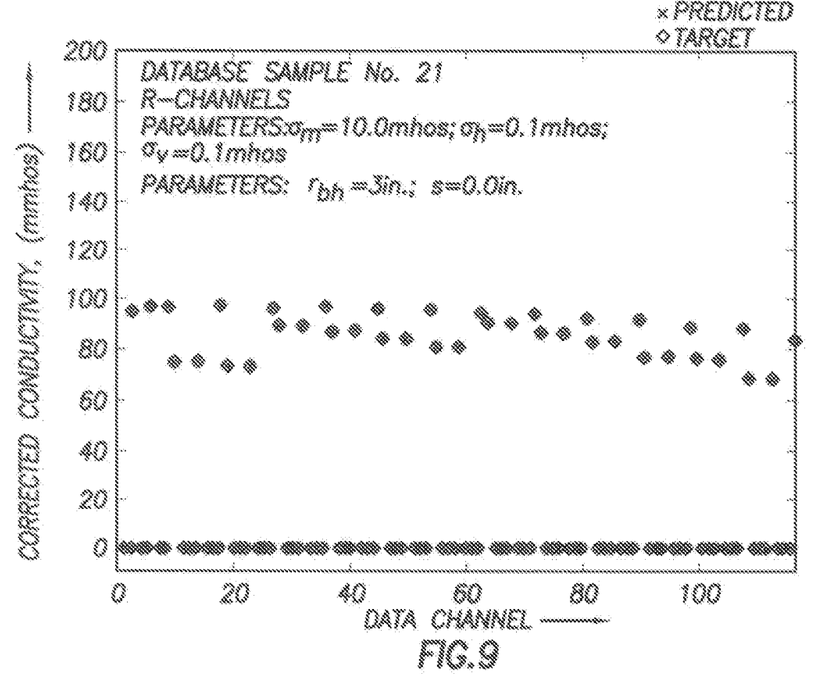

Referring to the flow diagram of FIG. 4, the block 410 represents initialization of an index i at 1. Inquiry is made (decision block 420) as to whether i is greater than N. If not, the block 430 is entered, this block representing the inputting of borehole and formation parameters for the i-th case of the database. In this example, the parameters r (borehole radius), d (tool standoff), $\sigma_m$ (mud conductivity), $\sigma_h$ (formation horizontal conductivity), and $\sigma_v$ (formation vertical conductivity). Database input vectors, $\vec{\sigma}_{a,i}^{(raw)}$, are then computed (block 440) for the i-th case in the database. In the present embodiment, this is implemented by computing, for the tool in a model having a formation and a borehole with the parameters for the present (i-th) case, using a forward model (e.g. based on Maxwell's equations), the 234 modeled measurement values. Database output vectors, $\vec{\sigma}_{a,i}^{(c)}$, are then computed (block 450) for the i-th case in the database. In the present embodiment, this is implemented by computing, for the tool in a model having a formation, without a borehole, with the formation parameters for the present (i-th) case, again using a forward model (e.g. based on Maxwell's equations), the 234 modeled measurement values. Accordingly, each computed database input vector and output vector, in the present example, is a 234 dimensional vector. The index, i, is then incremented (block 455), the block 420 is re-entered, and the loop 460 continues as all the N database cases are computed. Then, the inquiry of block 420 will be answered in the affirmative, and the block 480 is entered, this block representing the construction of the RBF mapping function in accordance with equation (18).

Referring again to FIG. 3, the block 330 represents construction of the cost function (equation (17)), and the block 340 represents minimization of the cost function to obtain the optimal weights (equation (21)) and widths, as above described. The remaining blocks of the flow diagram of FIG. 3 relate to obtaining and processing the measurements. Specifically, the block 350 represents positioning the logging tool at a depth level of interest and the block 360 represents implementing and storing a set of measurement values. Conventional calibrations and gain corrections can be applied (block 370) to obtain the raw apparent conductivities. Then, as represented by the block 380, these raw conductivities are input to the mapping function to obtain the interpolated values of borehole corrected measurements, from which the formation conductivities can be derived. The process can then be repeated at other depth levels to produce a log. As noted above, by including the borehole and formation parameters (e.g., borehole radius, mud conductivity, tool standoff, horizontal conductivity, and resistivity anisotropy) as elements in the database output vectors, the borehole and formation parameters (or selected ones of them) can also be predicted together with the borehole corrected array data.

To demonstrate the efficacy of the radial basis function interpolation in the present example, a relatively sparsely populated database of induction tool responses for the 234 data channels was computed using 5 values of $\sigma_m$, 6 values of $\sigma_h$, 3 values of anisotropy parameter ($\lambda$), 4 borehole radii, and 3 values of tool standoff. These responses represent the database inputs. The anisotropy parameter is defined in Eq. (8). The induction tool responses for the 234 data channels were also computed for the same formation parameters without a borehole. These represent the homogeneous medium responses and are the database outputs. After removing duplicate cases and some others that were not considered to be within physical limits for the tool or formation parameters a reduced database consisting of 916 cases was tested. Each test involved removing a sample (i.e., case) from the database and then using Eq. 4 to predict the borehole corrected responses for the 234 data channels of the induction tool. The weights used in Eq. 4 were computed from the database using Eqs. 12–16. The widths ($s_j$) used in Eq. 4 for the results presented were computed from the nearest neighbor distances ($\alpha_j$) of the input measurements. For the results shown, the following equation was used to compute the widths, $$s_j = 0.3 * \alpha_j. \tag{22}$$

Figure 10:
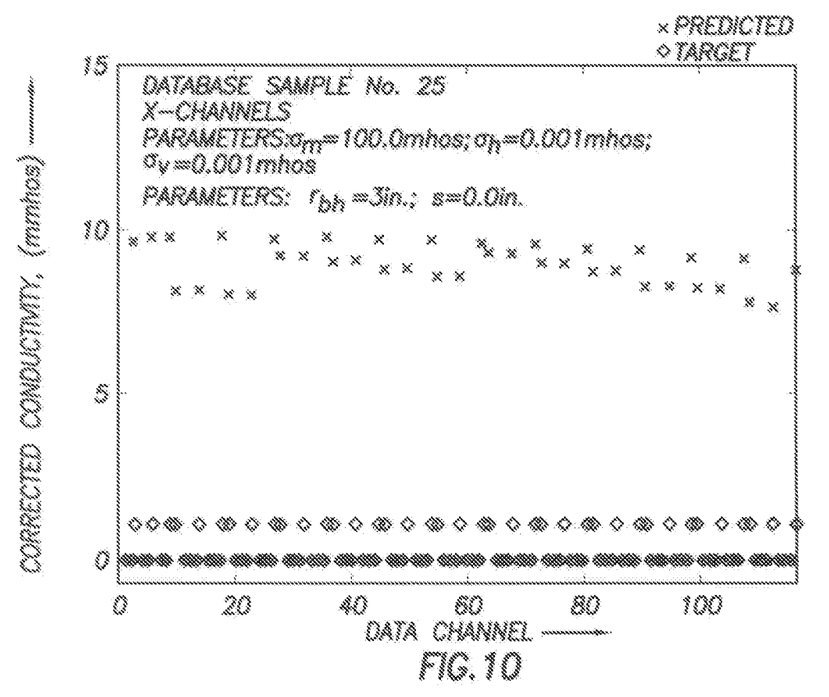
Figure 11:
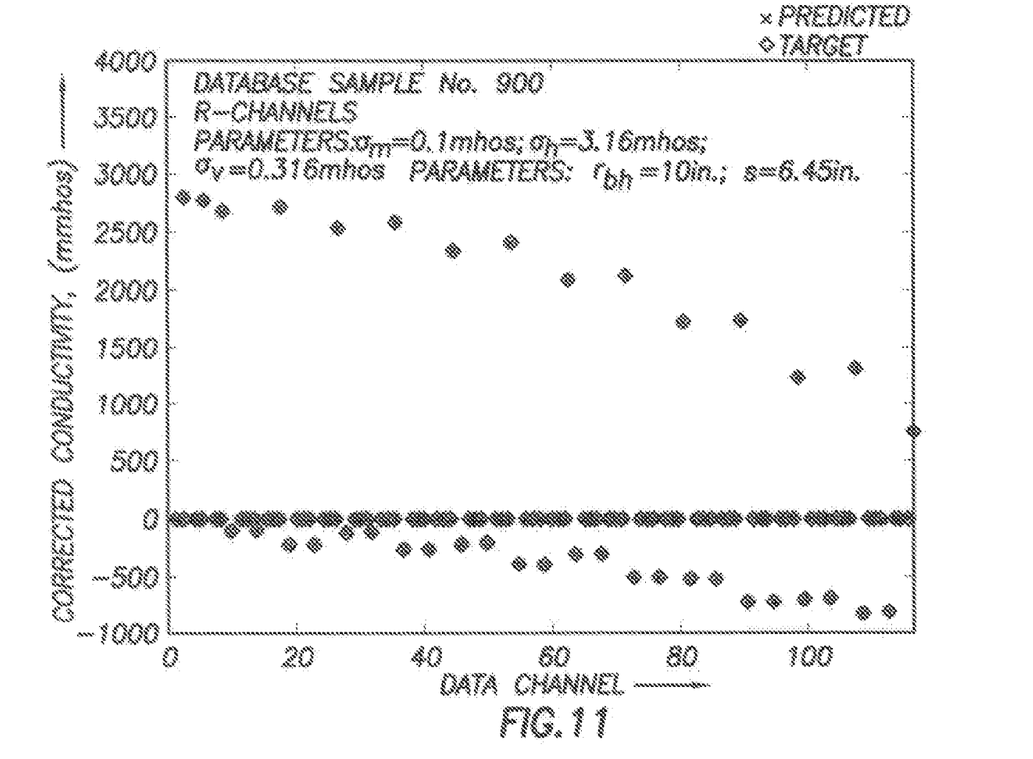

As discussed above, other techniques can be used for selecting the widths. The borehole corrected data predicted from Eq. (4) were compared with the homogeneous media (i.e., the database formations without a borehole) tool responses for all 234 data channels. In the majority of cases (about 80%), excellent agreement between the predicted borehole corrections and the target (i.e., the homogeneous medium responses) responses was found. (The symbols for the "predicted" values and "target" values overlap and are almost indistinguishable, when there is good agreement.) The instances where the agreement was poor can be traced to places where the database is too sparse for accurate interpolation. Some typical results are shown in FIGS. 5–11 for a few cases. The conductivity in the plots is in units of mmhos (equal to the more familiar unit mS/m). Note that the 117 R-channel results are shown in the plots except for FIG. 8 where X-Channel results are shown. It has been found generally that whenever the R-Channel borehole corrections agree with their target responses then the X-Channel responses agree equally as well with their targets responses (e.g., as can be seen from FIGS. 7 and 8). One of the failures is shown in FIG. 10. This case provides insight into how radial basis function interpolation would fail if the underlying database weren't adequately populated. Observe database sample no. 25, which represents one of the extreme cases in the database. For this case the borehole and formation parameters are: $\sigma_m$=10,000 mS/m, $\sigma_h$=1 mS/m, $\sigma_v$=1 mS/m, and the borehole radius is 3-inches. The tool was centered in the borehole. To compute the borehole corrected tool responses case no. 25 was removed from the database and the remaining 915 samples in the database were used in Eq. 4 to predict the borehole corrections. The "nearest" sample in the database is sample no. 26 which has identical borehole parameters as sample no. 25 but has different formation properties, e.g., $\sigma_h$=10 mS/m and $\sigma_v$=10 mS/m. As expected, the borehole corrected predictions for sample no. 25 are close to 10 mS/m because sample no. 26 is the dominant contributor to the summation in Eq. 4. To correct this problem, the database can be augmented to include low formation conductivity samples. The additional samples would have the same borehole parameters as sample no. 25 but would include samples with lower formation conductivities, e.g., closer to 1 mS/m. FIG. 11 shows the results for a database case with a large tool standoff along the x-direction.

The invention has been described with reference to particular preferred embodiments, but variations within the spirit and scope of the invention will occur to those skilled in the art. For example, although Gaussian RBFs are used in the description, it will be understood that other types of RBFs could be used, for example multi-quadrics RBFs or inverse multi-quadrics RBFs.

The invention claimed is:

1. A method for producing borehole-compensated values from non-borehole-compensated measurement signals taken with a logging device in a borehole in earth formations, comprising the steps of:

producing a database that includes a multiplicity of data points, each data point representing a combination of formation parameters and borehole parameters, database input vectors representing multi-dimensional non-borehole-compensated model measurement values respectively associated with said data points, and database output vectors representing multi-dimensional borehole-compensated model measurement values respectively associated with said data points;

deriving a multi-dimensional measurement signal vector from measurement signals taken with said logging device in said borehole; and interpolating said measurement signal vector using said database to obtain an interpolated output vector representative of borehole-compensated measurement signals.

2. The method as defined by claim 1, wherein said step of producing a database includes deriving a radial basis function mapping function, and wherein said step of interpolating comprises radial basis function interpolation.

3. The method as defined by claim 1, wherein said step of producing said database includes computing said database input vectors from the response of said logging device in a model formation with a borehole, and computing said database output vectors from the response of said logging device in a model formation without a borehole.

4. The method as defined by claim 2, wherein said step of producing said database includes computing said database input vectors from the response of said logging device in a model formation with a borehole, and computing said database output vectors from the response of said logging device in a model formation without a borehole.

5. The method as defined by claim 2, wherein said radial basis function mapping function maps said measurement signal vector to said interpolated output vector.

6. The method as defined by claim 2, further comprising the step of deriving, from said database, radial basis function weight and width parameters.

7. The method as defined by claim 5, further comprising the step of deriving, from said database, radial basis function weight and width parameters.

8. The method as defined by claim 6, wherein said step of deriving radial basis function weight and width parameters comprise producing a cost function and minimizing said cost function to determine said weight and width parameters.

9. The method as defined by claim 7, wherein said step of deriving radial basis function weight and width parameters comprise producing a cost function and minimizing said cost function to determine said weight and width parameters.

10. The method as defined by claim 6, wherein said step of deriving radial basis function weight parameters comprises solving interpolation equations, and wherein said step of deriving radial basis function width parameters comprises a nearest neighbor analysis.

11. The method as defined by claim 1, wherein said measurement signals are induction logging measurement signals.

12. The method as defined by claim 2, wherein said measurement signals are induction logging measurement signals.

13. The method as defined by claim 1, wherein said measurement signals are resistivity logging measurement signals.

14. The method as defined by claim 2, wherein said measurement signals are resistivity logging measurement signals.

15. The method as defined by claim 1, wherein said measurement signals are nuclear logging measurement signals.

16. The method as defined by claim 2, wherein said measurement signals are nuclear logging measurement signals.

17. The method as defined by claim 1, wherein said measurement signals are acoustic logging measurement signals.

18. The method as defined by claim 2, wherein said measurement signals are acoustic logging measurement signals.

19. A method for producing borehole-compensated values from non-borehole-compensated measurement signals taken with an induction logging device in a borehole in earth formations, comprising the steps of:

producing a database that includes a multiplicity of data points, each data point representing a combination of formation parameters and borehole parameters, database input vectors representing multi-dimensional non-borehole-compensated model measurement values respectively associated with said data points, and database output vectors representing multi-dimensional borehole-compensated model measurement values respectively associated with said data points;

suspending said induction logging device in the borehole, and producing measurement signals taken with said logging device;

deriving a multi-dimensional measurement signal vector from said measurement signals taken with said induction logging device in said borehole; and interpolating said measurement signal vector using said database to obtain an interpolated output vector representative of borehole-compensated measurement signals.

20. The method as defined by claim 19, wherein said step of producing a database includes deriving a radial basis function mapping function, and wherein said step of interpolating comprises radial basis function interpolation.

21. The method as defined by claim 19, wherein said step of producing said database includes computing said database input vectors from the response of said logging device in a model formation with a borehole, and computing said database output vectors from the response of said logging device in a model formation without a borehole.

22. The method as defined by claim 21, wherein said step of producing said database includes computing said database input vectors from the response of said logging device in a model formation with a borehole, and computing said database output vectors from the response of said logging device in a model formation without a borehole.

23. The method as defined by claim 20, wherein the data points in said database represent borehole radius, borehole conductivity, standoff of the logging device in the borehole, horizontal conductivity of the formations, and vertical conductivity of the earth formations.

24. The method as defined by claim 22, wherein the data points in said database represent borehole radius, borehole conductivity, standoff of the logging device in the borehole, horizontal conductivity of the formations, and vertical conductivity of the earth formations.

25. The method as defined by claim 19, further comprising deriving formation parameters from said output vector representative of borehole-compensated measurement signals.

26. A method for producing corrected output formation parameters from non-borehole-compensated measurement signals taken with a logging device in a borehole in earth formations, comprising the steps of:

producing a database that includes a multiplicity of data points, each data point representing a combination of formation parameters and borehole parameters, database input vectors representing multi-dimensional non-borehole-compensated model measurement values respectively associated with said data points, and database output vectors representing formation parameters respectively associated with said data points;

deriving a multi-dimensional measurement signal vector from measurement signals taken with said logging device in said borehole; and interpolating said measurement signal vector using said database to obtain an interpolated output vector representative of output formation parameters.

27. The method as defined by claim 26, wherein said step of producing a database includes deriving a radial basis function mapping function, and wherein said step of interpolating comprises radial basis function interpolation.

* * * * *